Jan. 7, 1947. R. A. CARLSON 2,413,810
FRICTION CLUTCH
Original Filed Feb. 14, 1941 2 Sheets-Sheet 1
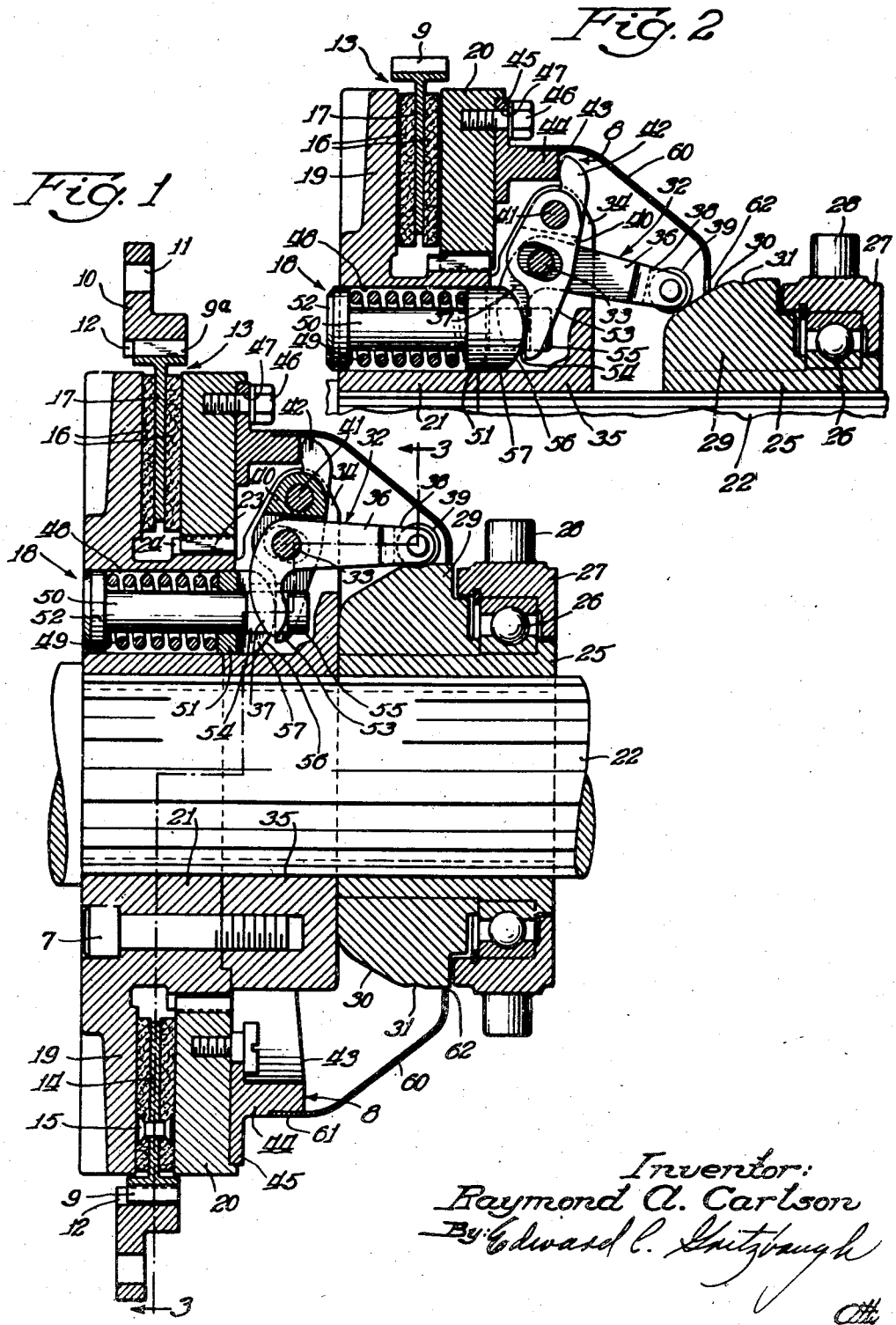
Inventor:
Raymond A. Carlson
By Edward C. Gritzbaugh Jan. 7, 1947.  R. A. CARLSON  2,413,810
FRICTION CLUTCH
Original Filed Feb. 14, 1941   2 Sheets-Sheet 2

Inventor:
Raymond A. Carlson
By Edward C. Gritzbaugh
Atty.

Patented Jan. 7, 1947

2,413,810

UNITED STATES PATENT OFFICE 2,413,810

FRICTION CLUTCH

Raymond A. Carlson, Rockford, Ill., assignor to Borg-Warner Corporation, Chicago, Ill., a corporation of Illinois Original application February 14, 1941, Serial No. 378,848. Divided and this application October 9, 1943, Serial No. 505,604

6 Claims. (Cl. 192—68)

1

This invention relates to friction clutches and particularly to an improved arrangement of driving and engaging means for the friction facing assembly.

This is a division of my United States application, Serial No. 378,848, filed February 14, 1941, which issued as Patent No. 2,334,382.

It is an object of the invention to provide, in a friction clutch of the type wherein the facing carrying means is in the form of an annulus having driving connection with an encircling drive transmitting member and having peripheral teeth meshing with internal teeth on said drive transmitting member, means for minimizing backlash between said teeth. To this end, the invention contemplates the formation of the facing supporting annulus in the form of a plurality of circumferentially separated segments to which the facings are secured, and the provision of additional segments which are loosely received in the spaces defined between said facings and the ends of the other segments and are provided with peripheral teeth adapted to snugly engage the teeth of the drive transmitting member under the effect of centrifugal force. Thus the loose additional segments, when gripped between the friction facings prevent independent movement of the facing supporting segments which would create backlash between said latter segments and the drive transmitting member.

Other objects, the advantages and uses of the invention will become more apparent after reading the following specification and claims, and after consideration of the drawings forming a part of the specification, wherein:

Fig. 1 is an axial sectional view of a clutch embodying my invention, the clutch being shown in engaged relation;

Fig. 2 is an axial sectional view showing the clutch disengaged; and

Figure 3:
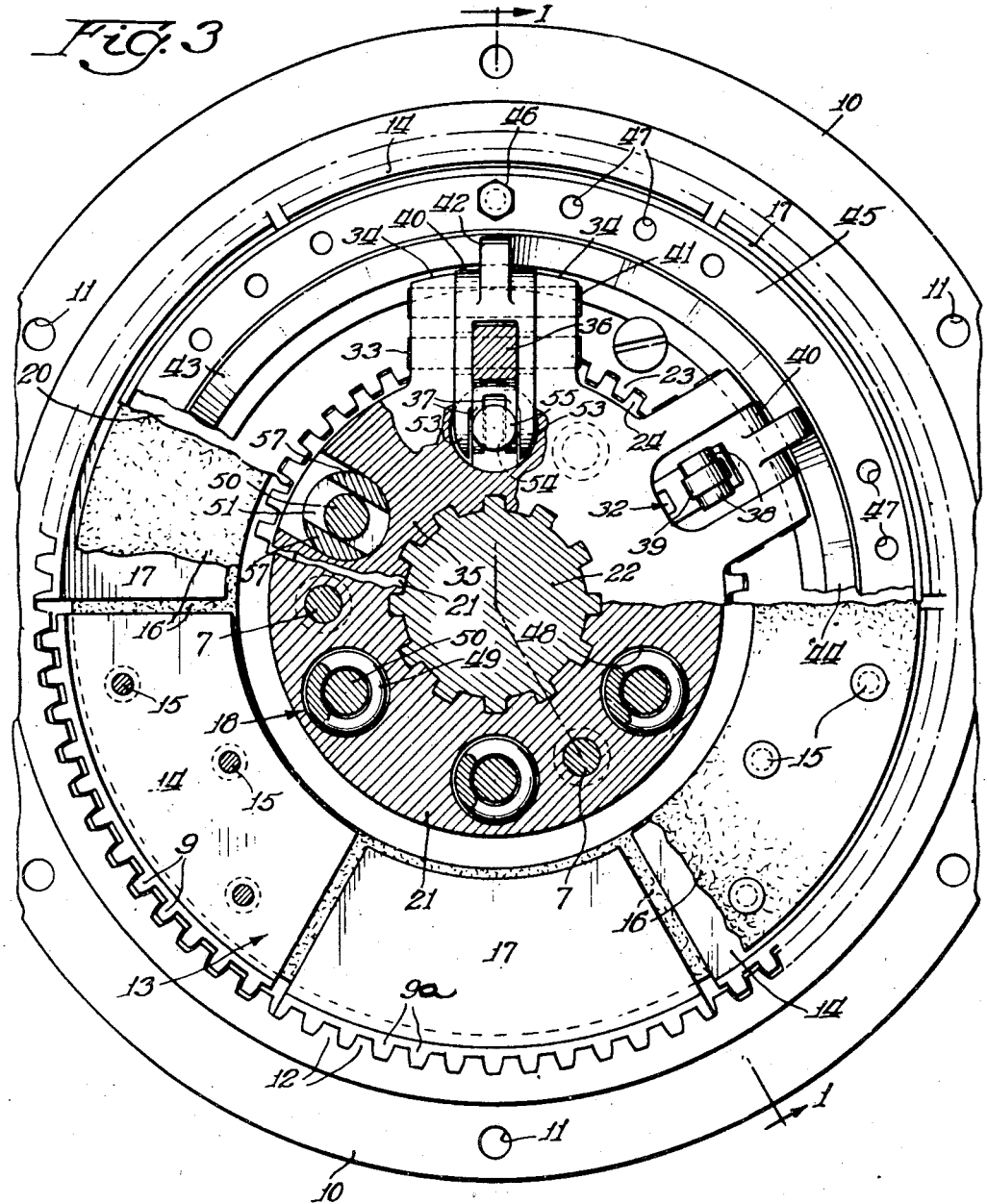
Fig. 3 is a transverse sectional view of the clutch, taken on the line 3—3 of Fig. 1.

As an example of one form in which the invention may be embodied, I have shown in the drawings a clutch of the heavy duty industrial type, including a drive transmitting member 10 having openings 11 by means of which it may be attached to a driving member such as for example, a flywheel, and having internal teeth 12 for transmitting drive to a driving clutch element indicated generally at 13. The driving element 13 includes a plurality of circumferentially separated facing supporting segments 14 to which are secured as by means of rivets 15, a pair of embracing facings 16 of suitable frictional material. Interposed between the segments 14 are a plurality of loose segments 17 of substantially the same thickness as the segments 14 so as to cooperate with the segments 14 in maintaining the facings 16 in parallel planes while taking the pressure of clutch engagement. The segments 17 are confined between the facings 16, the segments 14, and the drive ring 10.

The segments 14 and 17 are provided with peripheral teeth 9 and 9a respectively meshing with the internal teeth 12 of the drive ring 10. The teeth on the loose segments 17 are adapted to snugly engage the teeth 12 under the effect of centrifugal force, so as to take up the backlash between the facings and the drive ring 10, as will later be pointed out.

The facings 16 are adapted to be engaged between a pair of driven elements 19 and 20, the element 19 having a hub portion 21 which is splined upon a driven shaft 22 and the element 20 having internal teeth 23 meshing with splines 24 on the hub portion 21 so as to be drivingly connected thereto while capable of axial shifting movement to permit clutch engagement.

Mounted on the shaft 22 for axial shifting movement is a sleeve 25 which is connected through the medium of an end thrust bearing 26 with a collar 27 having trunnions 28 adapted to coact with a shifting fork of conventional design. Secured upon the sleeve 25 is an operating cam ring 29 having a frusto-conical cam surface 30 terminating in a reentrant locking groove 31.

Linkage for transmitting clutch operating movement from the cam 29 to the driven clutching elements 19 and 20, includes a plurality of levers 32 each fulcrumed on a pivot pin 33 mounted between a pair of ears 34 of a fulcrum member 35 which is fixedly associated with the driven element 19 and shaft 22 as for example, by means of the machine screws 7 securing it to the driven element 19. The levers 32 are in the form of bell cranks, each including an arm 36 extending in a generally axial direction and an arm 37 extending radially inwardly. The arm 36 is formed at its end with a fork 38 in which is journalled a roller 39 adapted to coact with the cam face 30.

The transmitting linkage further includes manual adjustment means, indicated generally at 8, and resilient transmission links, indicated generally at 18, both interposed in series with each other between the levers 32 and the driven element 20.

The adjustment means 8 comprises an adjusting cam ring 44 and a plurality of levers 40, the ring 44 being carried by the driven element 20 and the levers 40 being operatively interposed between the ring 44 and the resilient link 18. The levers 40 are embraced between the ears 34 of the fulcrum member and are fulcrumed on pivot pins 41 mounted in the ears 34 outwardly of the levers 32. The inner arms of the levers 40 are bifurcated to provide spaced furcations 53 which embrace the levers 32. The outer arms 42 of the levers 40 are engaged against cam surfaces 43 on the adjusting ring 44. The ring 44 has a flange 45 which is secured against the rear face of the driven element 20 by means of screws 46. The screws 46 extend through openings 47 in the flange 45 and may be removed to permit the ring 44 to be rotated with reference to the driven element 20 and reinserted through different openings 47.

The resilient links 18 are mounted in axially extending cylindrical bores 48 in the hub portion 21 of the driven element 19. Each link 18 includes a coil spring 49, a draw bolt 50 and a washer 51, the spring 49 being engaged between the washer 51 and a head 52 on one end of the draw bolt 50. The head 52 and washer 51 are fitted loosely in the bore 48 so as to be axially slidable therein.

The resilient links are each operatively interposed between an arm 37 of a lever 32 and the furcations 53 of the corresponding lever 40. The arm 37 has at its end a fork embracing the bolt 50, received in notches 54 formed in the sides of the bolt, and acting against a head 55 defining one extremity of the respective notches 54. The furcations 53 of the lever 40 are engaged against arcuate end surfaces 56 of a pair of wings 57 formed on the washer 51.

Rotation of the adjustment ring 44 with reference to the driven element 20 causes the levers 40 to be adjusted in a clockwise direction around their pivots 41, the furcations 53 moving to the left and compressing the springs 49.

The cam ring 44 forms a support for a clutch cover 60 which has a ring 61 snugly fitted on the periphery of the cam ring 44 and tapers rearwardly and inwardly to an opening 62 which receives the operating member 21.

In the operation of the clutch, assuming it to be in disengaged position as shown in Fig. 2, the rotation of torque transmitting ring 10 by the power source as contemplated will result in the free arcuate segments 17 being moved radially outwardly bringing the teeth 9a thereof into close engagement with the opposed teeth 12 of the torque ring 10. The movement of operating cam 29 to the left in Fig. 2 will cause the rollers 39 to ride radially outwardly against the cam face 30, in turn causing the levers 32 to pivot in a counterclockwise direction about their fulcrum pivots 33. The arms 37 of the levers 32 will swing to the right as viewed in the drawings, drawing the bolts 50 to the right, and transferring movement through the coil springs 49 and the washers 51, to the adjustment levers 40, causing the latter to swing in a counterclockwise direction. The outer arms 42 of the levers 40, bearing against the cam ring 44, transmit the movement to the driven element 20, advancing the latter to effect clutch engagement. The reaction is transmitted from the levers 32 to the pivots 33, thence to the fulcrum member 35 and the driven element 19. Thus the two driven elements are drawn together into clutching engagement with the drive element 13. As engagement is attained, the spring 49 will yield, and thus the engaging pressure is fixed at a maximum determined by the spring load. When the clutch begins to rotate, the loose additional segments 17 are centrifugally moved outward so that their teeth 9a fit snugly into internal teeth 12 on the drive transmitting ring 10. When pressure members 19 and 20 have moved into frictional engagement with the facings 16 as above described, the clutch is fully coupled and the fixed as well as the loose segments 14 and 17 are firmly held between the facings. Due to the snug fit of teeth 9a with ring teeth 12 there can be no relative rotative movement between any of the clamped parts, including the ring teeth 12 and the fixed segment teeth 9, and consequently backlash between these latter meshed teeth is impossible.

The cam surface 30 of the operating member provides for considerably more movement of the levers 32 than is necessary for advancing the driven elements into engagement with the drive element. The surplus movement is absorbed in the compression of the spring 49. This surplus movement is utilized to take up slack in the linkage that would otherwise be occasioned by wearing down of the facings. Thus the yielding transmission links 18 provide for automatic adjustment for facing wear within a limited range. When this range of adjustment has been exhausted, it may be extended by manually adjusting the cam ring 44. Within the new range of adjustment thus provided, the linkage will continue to provide automatic adjustment for further facing wear.

The invention provides an arrangement which is very compact. The resilient transmission elements are accommodated within the hub of the driven element 19. The levers 32 are partially nested in the levers 40.

It will be apparent that other available forms and arrangements for engaging and disengaging the clutch may be provided in combination with my novel clutch plate and driving assembly to which the present case is primarily directed.

While I have described my invention in connection with its specific embodiment thereof, it is to be understood that this is by way of illustration and not by way of limitation and the scope of my invention is defined solely by the appended claims which should be construed as broadly as the prior art will permit.

I claim:

1. In a friction clutch, an annular torque-transmitting member having internal teeth, a plurality of circumferentially spaced facing carrying segments having external teeth meshing with said internal teeth, a pair of facings secured to the respective sides of said segments, and a plurality of segments, loosely confined between said facings and the ends of said supporting segments and having peripheral teeth meshing with said internal teeth and adapted to snugly engage the same under the effect of centrifugal force, said loosely confined segments being adapted to be clamped between said facings during driving operation of the clutch to minimize blacklash between said annular member and said facing carrying segments.

2. In a friction clutch, an annular torque-transmitting member having internal teeth, a plurality of circumferentially spaced facing carrying segments having driving connection with said torque-transmitting member, a pair of facings secured to the respective sides of said segments, and a plurality of segments, loosely confined between said facings and the ends of said supporting segments and having peripheral teeth meshing with said internal teeth and adapted to snugly engage the same under the effect of centrifugal force, said loosely confined segments being adapted to be clamped between said facings during driving operation of the clutch to minimize backlash between said annular member and said facing carrying segments.

3. In a friction clutch arrangement, means defining an annular torque transmitting ring having radially inwardly extending teeth on the inner periphery thereof, a first plurality of separate circumferentially spaced segmental plates having radially outwardly extending teeth on the outer periphery thereof meshing with said inner peripheral teeth of said torque ring, a pair of annular friction facings secured to the opposite sides of each of said first plurality of plates and a second plurality of circumferentially spaced segmental plates interposed between the ends of successive ones of said first named plates, said second plurality of plates having radially outwardly extending teeth and being freely movable radially outwardly between said facings under the influence of centrifugal force to effect close engagement of said teeth of said second plurality of plates with the inner peripheral teeth of said torque transmitting ring upon said ring and plates being rotated prior to clutch engagement, whereby backlash between said ring and said first plurality of segmental plates is prevented during clutch engagement.

4. In a friction clutch arrangement, means defining an annular torque transmitting ring having radially inwardly extending teeth on the inner periphery thereof, a first plurality of separate circumferentially spaced segmental plates having radially outwardly extending teeth on the outer periphery thereof meshing with said inner peripheral teeth of said torque ring, a pair of annular friction facings secured to the opposite sides of each of said first plurality of plates and a second plurality of circumferentially spaced segmental plates interposed between the ends of successive ones of said first named plates, said second plurality of plates having radially outwardly extending teeth and being freely movable radially outwardly between said facings under the influence of centrifugal force to effect close engagement of said teeth of said second plurality of plates with the inner peripheral teeth of said torque transmitting ring, means including a pressure plate and means for operating the same for engaging said friction facings therebetween subsequent to the initial rotation of said torque ring whereby said second named plurality of arcuate plates are held between said annular facings in positions wherein the teeth thereof cooperate with the teeth of said torque ring to prevent backlash between said ring and said first segmental plates.

5. In a friction clutch, an annular torque-transmitting member; a plurality of circumferentially spaced facing carrying members having driving connection with said torque-transmitting member; a pair of facings secured to the respective sides of said circumferentially spaced members; and a plurality of centrifugally influenced members loosely confined between said facings and the ends of said carrying members and normally rotatable with said torque-transmitting member, and means for effecting a snug engagement of said centrifugally influenced members with said torque-transmitting member under the influence of centrifugal force for effecting a driving connection between said loose members and said torque-transmitting member, said loosely confined members being adapted to be clamped between said facings during driving operation of the clutch whereby to minimize backlash between said torque-transmitting member and said facing carrying members.

6. In a friction clutch, an annular torque-transmitting member having internal teeth; a plurality of circumferentially spaced facing supporting members having external teeth meshing with said internal teeth to establish a driving connection with said torque-transmitting member; friction facings secured to opposite sides of said supporting members; a plurality of centrifugally influenced members loosely confined between said facings in the spaces between said supporting members; peripheral teeth on said centrifugally influenced members normally loosely meshed with said internal teeth and adapted to be snugly engaged therewith under influence of centrifugal force; and clamping members between which said supporting members, friction facings, and centrifugally influenced members are adapted to be clamped during driving operation of the clutch, whereby the clamped centrifugally influenced members are effective to minimize backlash between said torque-transmitting member and said facing supporting members.

RAYMOND A. CARLSON.